March 26, 1940. W. F. FELTENBERGER 2,194,647
CABLE CLAMP
Filed Feb. 20, 1939
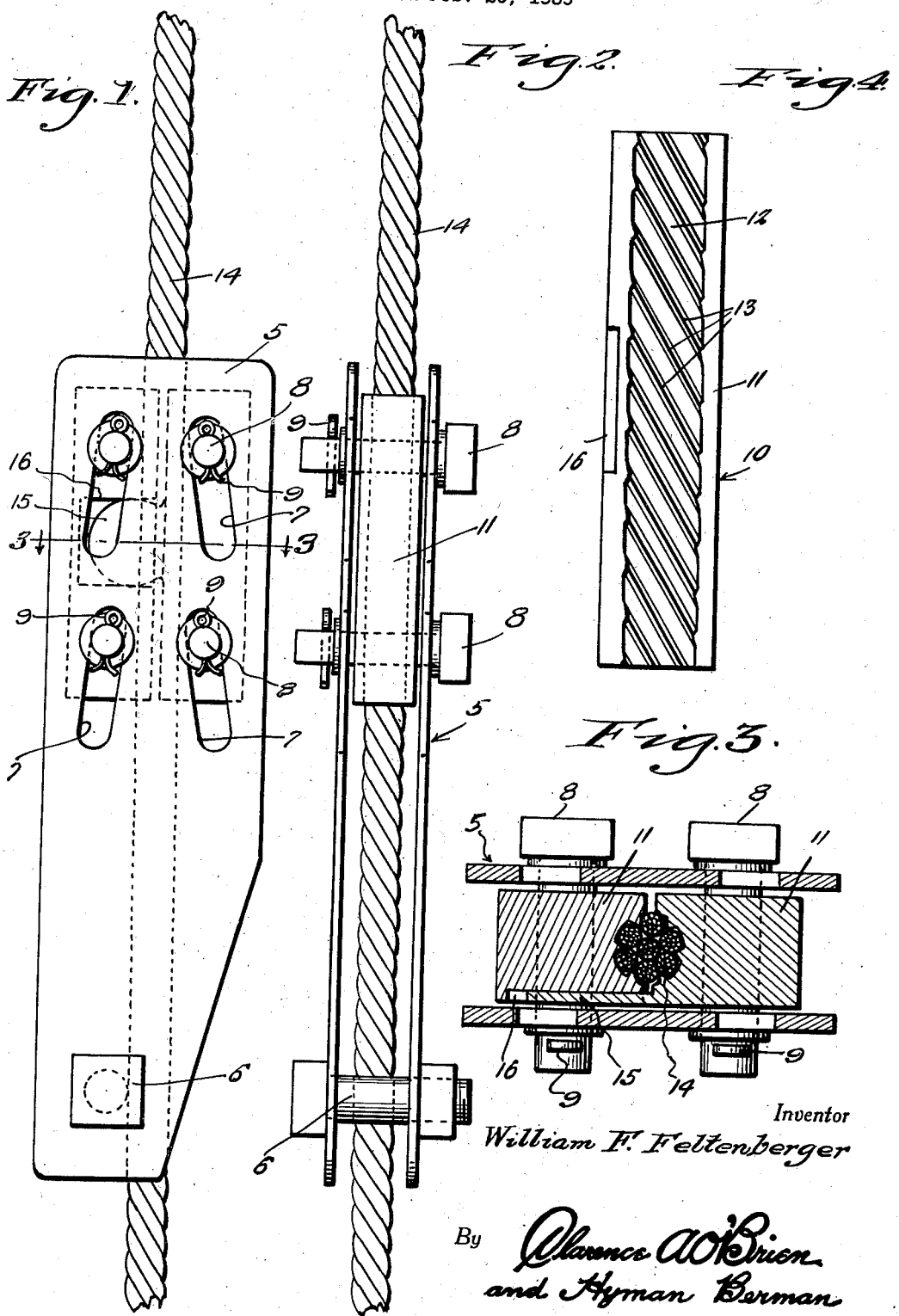
Inventor
William F. Feltenberger
By Clarence A. O'Brien
and Hyman Berman
Attorneys Patented Mar. 26, 1940

2,194,647

UNITED STATES PATENT OFFICE 2,194,647

CABLE CLAMP

William F. Feltenberger, Chester, Pa., assignor of fifty per cent to Vivian Rhoads, Chester, Pa.

Application February 20, 1939, Serial No. 257,519

3 Claims. (Cl. 24—126)

This invention relates to cable clamps, and has for the primary object the provision of a device of this character which will be self-tightening with a positive grip on a cable when under load to obviate any possibility of slipping relative to said cable and is so constructed that it may be easily and quickly applied to any portion of the cable and eliminate the necessity of forming an eye in the cable in order to hitch thereto and which practice tends to weaken the cable and decrease its life.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a clamp shown adapted to a fragmentary portion of a cable and having gripping relation with the latter.

Figure 2 is an edge view illustrating the clamp adapted to a portion of the cable.

Figure 3 is a sectional view taken on the line 3—3 of Figure 1.

Figure 4 is an edge view illustrating one of the jaws.

Referring in detail to the drawing, the numeral 5 indicates companion parallel spaced plates 5, each tapering slightly toward one end. A tie bolt 6 connects the plates adjacent one of the ends and is employed for connecting the device onto a load. The companion plates further are provided with pairs of diverging slots 7 through which extend bolts 8 apertured to receive cotter keys or similar fasteners 9. The bolts 8 are employed for removably mounting between the companion plates jaws 10 each in the form of an elongated block 11 having one longitudinal face thereof grooved, as shown at 12. The walls of the grooves have formed therein ribs 13 having a spiral pitch thereto.

The jaws 10, as before stated, are arranged between the companion plates 5 with the grooved faces 12 thereof in opposed relation to receive therein a cable 14. The cable is of a conventional construction, that is, composed of a plurality of spirally twisted metallic strands. The ribs 13 of the jaws are for the purpose of receiving therebetween the spiral strands of the cable and thereby permit the jaws to obtain a positive grip on the cable. With the jaws applied to the cable as shown in Figures 1 and 2, and a load attached to said plates through the medium of the bolt 6, the jaws will be self-tightening on the cable due to the bolts 8 which extend therethrough operating in the slots 7. A slight reverse movement of the device on the cable will release the jaws from the latter.

One of the jaws has formed thereon a substantially circular shaped tongue 15 received in a groove or notch 16 formed in the other jaw. The tongue fitting in the notch is for the purpose of retaining the jaws in proper alignment with each other and which will permit the jaws to be separated or moved apart during the use of the device.

Either of the jaws may be readily detached from the companion plates 5 by the removal of the bolts which pass through the jaw. The removal of the bolts is an extremely simple matter owing to the fact that they are held in operative position through the use of cotter keys, consequently permitting the entire operation to take place without the use of a wrench or similar tool. With one of the jaws removed, the companion plates may be placed on any portion of the cable with the latter extending between the companion plates, the removed jaw then may be readily replaced placing the device in operation to grip the cable as soon as a load is placed thereon.

A device of the character described and shown in the drawing will obviate any possibility of the cable being twisted or bent while under a load and obviates the necessity of forming an eye or similar part in the cable in order to attach thereto. By eliminating the possibility of bending the cable for any reason naturally the life of the cable will be materially increased. Also the construction of the present invention will permit its application to the cable regardless of what function the cable is performing.

It is believed that the foregoing description, when taken in connection with the drawing will fully set forth the construction and advantages of this invention to those skilled in the art to which such device relates, so that further detailed description will not be required.

What I claim is:

1. A cable clamp comprising elongated companion plates arranged in opposed relation and having pairs of slots with the slots of each pair arranged in diverging relation, bolts extending through said slots, removable keys for said bolts, elongated jaws supported by said bolts and having grooves in the opposing faces thereof to receive therebetween a cable, ribs formed on the walls of the grooves and having a spiral pitch thereto for gripping the cable, and means for connecting a load to said plates.

2. A cable clamp comprising companion plates arranged in opposed relation and each having pairs of slots with the slots of each pair arranged in diverging relation, bolts extending through said slots, removable keys for said bolts, elongated jaws supported by said bolts and having grooves in the opposing faces thereof to receive therebetween and grip a cable, a slidable connection between said jaws whereby the jaws may move relative to each other and be entirely separated, and means for attaching a load to said plates.

3. A cable clamp comprising companion plates arranged in opposed relation and each having pairs of slots with the slots of each pair arranged in diverging relation, bolts extending through said slots, removable keys for said bolts, elongated jaws supported by said bolts and having grooves in the opposing faces thereof to receive therebetween and grip a cable, one of said jaws having a notch, a tongue formed on the other jaw and received in the notch, the walls of said grooves having ribs arranged with a spiral pitch, and a tie bolt connecting said plates for securing a load thereto.

WILLIAM F. FELTENBERGER.